Patented July 31, 1928.

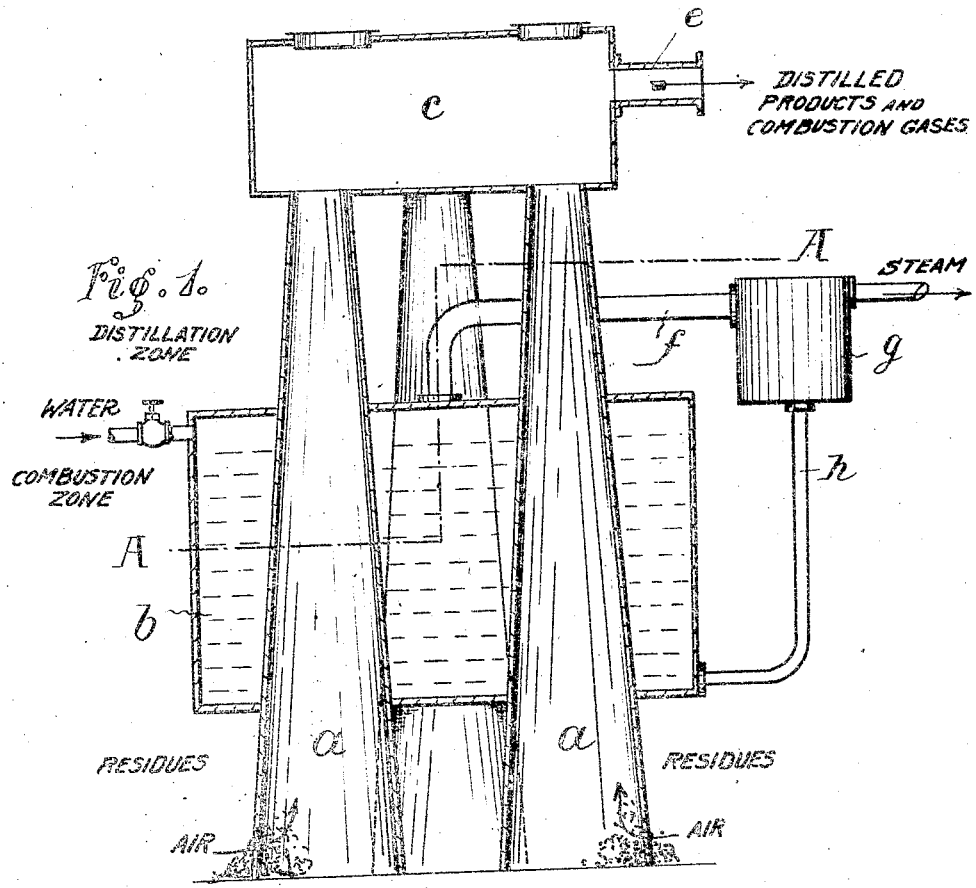
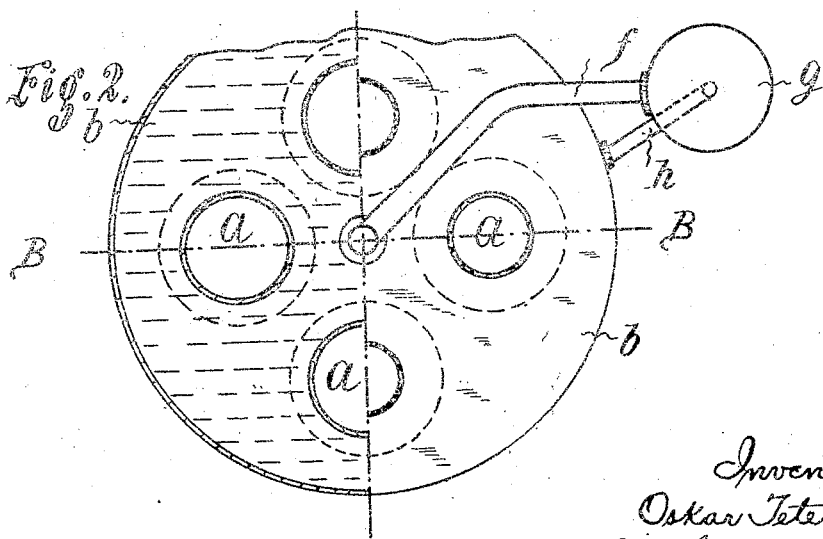

1,678,751

UNITED STATES PATENT OFFICE.

OSKAR TETENS, OF OERLINGHAUSEN-LIPPE, GERMANY, ASSIGNOR TO THE FIRM RECORD CEMENT-INDUSTRIE G. M. B. H., OF FRANKFORT-ON-THE-MAIN, GERMANY.

METHOD OF DISTILLING OIL SHALE AND PROVIDING A RAW MATERIAL SUITABLE FOR THE MANUFACTURE OF HYDRAULIC CEMENT.

Application filed September 19, 1924, Serial No. 738,729, and in Germany July 14, 1924.

The present invention relates to the method of distilling oil shale and producing a raw material suitable for the manufacture of hydraulic cement.

The invention consists in burning oilshale mixed with limestone, marl, or lime and similar calcareous material in convenient apparatus for producing steam, where the distilled oil can be recovered.

It was surprising to note that with oilshale, the heating value of which is far below that of coal, the production of steam, the manufacture of mortar forming material and the recovery of the distillation products of the oilshale could be carried out in one process. This is the more surprising as by the evaporation of the distillable products from shale only a part of the energy present in the oilshale is employed for heating purposes. One should expect that any loss of material having heating value should be avoided, when oilshale is burned with added limestone, to obtain a raw material for mortar. But this is not the fact.

According to this invention the oilshale mixed with limestone, marl, etc. is burnt in a convenient apparatus allowing distillation and recovery of the distillation products. At the same time also other fuels having relatively a very little value can be added, for example slack, breeze and similar fuel wastes. The use of such other fuels can take place in any desired measure. The special feature of this invention is the addition of heat absorbing materials to the fuel, used for the manufacture of steam. Special materials, strongly absorbing heat, as limestone or marl, which by their decomposition lower the temperature, are employed. The amount of admixture is best chosen so, that no sintering takes place. By avoiding sintering of the shale residues it is possible to obtain a valuable raw material for mortar.

The residues are worked either directly by milling eventually after an addition of other materials and a second burning, or the burnt shale separated from the residue is used for the manufacture of cement according to well known processes.

The residues are furthermore a very good material for the manufacture of artificial stones.

The annexed drawing shows a very convenient apparatus for the execution of this process and in which—

Figure 1 is a vertical section showing parts in elevation, and

Fig. 2 is a section on line A—B Fig. 1.

$b$ is a boiler filled with water through pipe $i$ and is connected by tube $f$ with the evaporator $g$, from which the steam goes out by a tube, whereas the condensed water enters back into the boiler by tube $h$. The fuel, a mixture of oilshale and limestone or marl is placed in the bunker $c$, which is provided with an exit $e$ for the gases. The fuel mixture is burnt within the downwardly enlarging tubes $a$, from where the residues are taken out by machinery, arranged under the tubes $a$ and not shown in this drawing or by hand. The heating tubes $a$ are wider at their lower ends and their number is variable. The oilshale is burnt within the tubes $a$ just there where the tubes $a$ are surrounded by the boiler $b$ so that the combustion zones in the tubes is surrounded by the boiler and the temperature of this zone reduced.

The necessary air for burning enters according to the principle of counter-current and is preheated by the burnt materials (residues), which are cooled thus at the same time. The gases of combustion are cooled by the fuel mixture in the upper part of the tubes and evaporate the distillable products from the oilshale contained in the tubes $a$ between the level of the boiler $b$ and the bunker $c$. Thus the output of heat is a very good one. The described boiler makes it very easy to measure the amount of materials which are to be added to the oilshales. With the enlargement of the diameter of the tubes for burning, as well as with a raise of the steam tension it has been found, that a greater amount of heat absorbing materials must be added to the oilshales. Thus a direct regulation of the fuel mixture is possible.

Claims:

1. The method of distilling oil shale and producing a raw material suitable for the manufacture of hydraulic cement, which comprises burning the shale mixed with non-combustible calcareous material, cooling the combustion zone by a confined body of water surrounding the same and simultaneously producing steam therefrom, and maintaining a column of said mixture above and in contact with said zone, and obtaining oil from such column by the hot gases ascending from the zone, and discharging from the zone a raw material suitable for the manufacture of hydraulic cement.

2. The method of distilling oil shale and producing a raw material suitable for the manufacture of hydraulic cement, which comprises burning the oil shale mixed with non-combustible calcareous material and fuel waste, cooling the combustion zone by a confined body of water surrounding the same and simultaneously producing steam therefrom, and maintaining a column of said mixture above and in contact with said zone, and obtaining oil from such column by the hot gases ascending from the zone, and discharging from the zone a raw material suitable for the manufacture of hydraulic cement.

3. The method of distilling oil shale and producing a raw material suitable for the manufacture of hydraulic cement, which comprises burning the shale admixed with calcareous material in a gradually widening descending column, cooling the combustion by a confined body of water surrounding said zone sufficient to prevent sintering of the mixture, and simultaneously producing steam therefrom, maintaining a sufficient body of the mixture above said zone to cool the ascending products of combustion and obtain oil from the shale in said body of mixture and discharging the solid residue from the larger lower end of said column and grinding the solid residue to hydraulic binding material.

4. The method of distilling oil shale and producing a raw material suitable for the manufacture of hydraulic cement, which comprises burning the shale mixed with calcareous material in a plurality of gradually widening descending columns, cooling the combustion by a confined body of water common to and surrounding the columns at the combustion zones thereof sufficient to prevent sintering of the mixture, and simultaneously producing steam therefrom, maintaining a sufficient body of the mixture above said zone to cool the ascending products of combustion and obtain oil from the shale in said columns, mixing the gaseous products at the tops of said columns in a chamber common to said columns and separately discharging from the bottoms of said columns solid residues suitable for the manufacture of hydraulic cement.

In testimony that I claim the foregoing as my invention, I have signed my name.

OSKAR TETENS.